United States Patent [19]
Hautmann et al.

[11] 3,807,082
[45] Apr. 30, 1974

[54] APPARATUS FOR KILLING INSECTS

[75] Inventors: Horst Hautmann, Neuburg/Donau, Germany; Max Geiger, Riehen, Switzerland

[73] Assignees: Global-Werk GmbH, Postfach; Ciba-Geigy AG, Basel, both of, Germany

[22] Filed: Apr. 3, 1972

[21] Appl. No.: 240,445

[30] Foreign Application Priority Data
July 16, 1971 Germany............................ 2135700

[52] U.S. Cl...................... 43/125, 239/55, 424/219
[51] Int. Cl.............................................. A01n 13/00
[58] Field of Search............ 43/125, 124, 129, 131, 43/132 R, 132 A; 239/55, 56; 206/45.14; 220/60; 424/78, 219

[56] References Cited
UNITED STATES PATENTS

| | | | |
|---|---|---|---|
| 3,717,303 | 2/1973 | Daeninckx............................ | 239/55 |
| 3,318,769 | 5/1967 | Folckemer et al..................... | 424/78 |
| 3,636,207 | 1/1972 | Bounet et al. ...................... | 43/131 X |
| 3,608,062 | 9/1971 | Alfes et al.......................... | 43/131 X |
| 2,956,366 | 10/1960 | Wiesmann............................ | 43/131 |
| 3,630,446 | 12/1971 | Roth et al.......................... | 43/131 X |
| 3,659,373 | 5/1972 | Daeninckx............................ | 43/125 |
| 1,972,368 | 9/1934 | Alex................................. | 239/55 X |
| 2,808,679 | 10/1957 | Collins.............................. | 43/131 |
| 2,069,335 | 2/1937 | Salfisberg......................... | 43/131 UX |
| 3,343,664 | 9/1967 | Poitras.............................. | 239/56 X |

*Primary Examiner*—James H. Czerwonky
*Attorney, Agent, or Firm*—Melvin A. Crosby

[57] ABSTRACT

An apparatus for killing insects in which a housing is provided having slits therein for the passage of air and which housing is adapted to support on the inside thereof, and in spaced relation to the housing walls, one or more plate-like bodies which carry a volatile insecticidal agent and at least one agent in the form of a stabilizer and/or an evaporation inhibiter. In particular, unmodified epoxy resin is employed as a stabilizer comprising Bisphenol A and epichloro-hydrin for the volatile insecticidal agent and the evaporation retarder can also be included with the insecticidal agent. The plates carrying the insecticidal agent and the added agents may consist of cellulose and asbestos admixed and formed into the form of thin plates.

15 Claims, 7 Drawing Figures

3,807,082

APPARATUS FOR KILLING INSECTS

The present invention relates to a device for killing insects and is particularly concerned with such a device employed in respect to a vaporizable insecticidal agent which passes from a carrier body into the atmosphere.

A known insecticidal agent is dimethyl dichlorovinyl phosphate, hereinafter referred to in the specification as DDVP. This insecticidal agent shows the desired effect with respect to killing insects but, heretofore, the use thereof has been severely restricted because DDVP, in the course of time, and under the action of moisture and oxygen and light, breaks down into component parts which are ineffective as insecticides.

It has been proposed to prevent, or inhibit, the referred to decomposition of DDVP by adding thereto epichlorohydrin as a stabilizer. Epichlorohydrin, however, volatilizes relatively rapidly and, upon passage into the atmosphere, can cause irritation to the mucous membranes of the throat, nose, and eyes and, even to the ear, and thus cannot be considered a suitable material to utilize as a stabilizer for the DDVP insecticide.

Also, DDVP volatilizes relatively rapidly, and a given quantity of thin material is not effective over as long a period as is to be desired.

With the foregoing in mind, the primary objective of the present invention is the provision of a substance, or substances, to employ with a vaporizable insecticidal agent, especially DDVP, which will prevent decomposition of the DDVP in the aforesaid manner so that the DDVP will remain effective over a longer period of time than has heretofore been possible.

A further object of the present invention is the provision of a suitable carrier member for carrying the insecticidal agent and the substances admixed therewith.

A still further object is the provision of a special housing arrangement for supporting the carriers which carry the insecticide and the agent and the additives.

A still further object of this invention is the provision of a substance which, when added to a vaporizable insecticidal agent, such as DDVP, will inhibit the decomposition thereof, and also retard the evaporation thereof, thereby to maintain the insecticidal agent effective for a prolonged period of time.

The foregoing objects as well as still other objects and advantages of the present invention will become more apparent upon reference to the following detailed specification taken in connection with the accompanying drawings in which.

BRIEF SUMMARY OF THE INVENTION

According to the present invention, carrier plates of a somewhat porous nature are made up, for example, of cellulose and asbestos, and these plates are then impregnated with a material in the form of a solution of a volatile insecticidal agent, a stabilizer therefor and an evaporation retarding agent.

As an insecticidal agent, dimethyl dichlorovinyl phosphate (DDVP) is preferred and, as a stabilizer, there is preferred unmodified epoxy resin. Such a resin, as is known can be prepared from Bisphenol A and epichlorohydrin. In this respect, reference is made to "Noller's Chemistry of Organic Compounds", 1960 edition, pages 514 and 750.

Porous plates impregnated with the insecticide and the additives thereto remain effective for a prolonged period of time.

Figure 1:
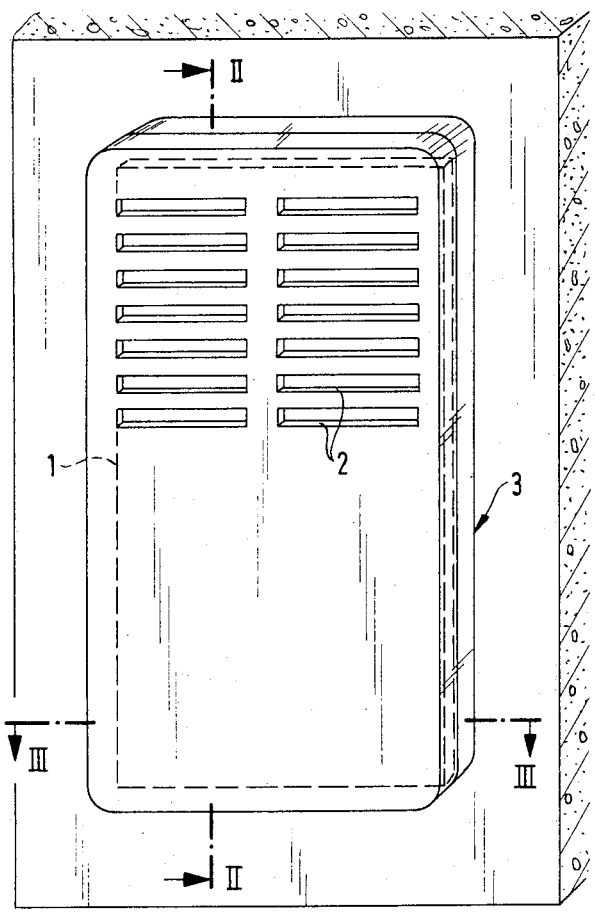
FIG. 1 is a perspective view showing one form which a housing for receiving a carrier for the insecticidal agent can take.
Figure 2:
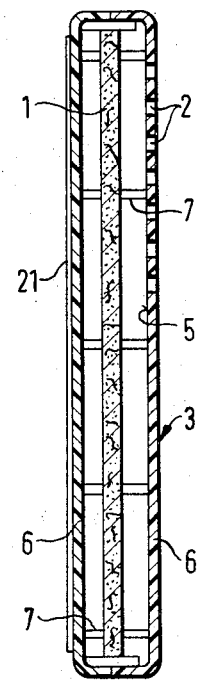
FIG. 2 is a vertical section taken through the housing of FIG. 1 and is indicated by line II–II on FIG. 1.
Figure 3:
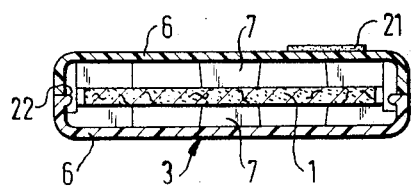
FIG. 3 is a transverse section through the housing indicated by line III–III on FIG. 1.

DETAILED DESCRIPTION OF THE INVENTION:

Referring to the drawings somewhat more in detail, FIGS. 1 through 3 show an arrangement in which a single plate 1 is installed in a flat, vertically arranged, cubical housing 3 having slits 2 in at least one of the larger side walls for the passage of air through the housing. Plate 1 is maintained in spaced relation with the front and back walls 6 of the housing by spacer bars or ribs 7 upstanding from the insides of the said walls and which engage opposite sides of the plate when the two parts of the housing are placed together.

The arrangement of FIGS. 1 to 3 is adapted for mounting on a surface, such as a wall surface, in any convenient manner, such as by the adhesive means 21 provided on the wall of the housing opposite the wall containing the slits.

As will be best seen in FIG. 3, the housing may be separable with front and back parts with the two parts of the housing detachably secured together by cooperating elements of a snap connection as indicated at 22.

Figure 4:
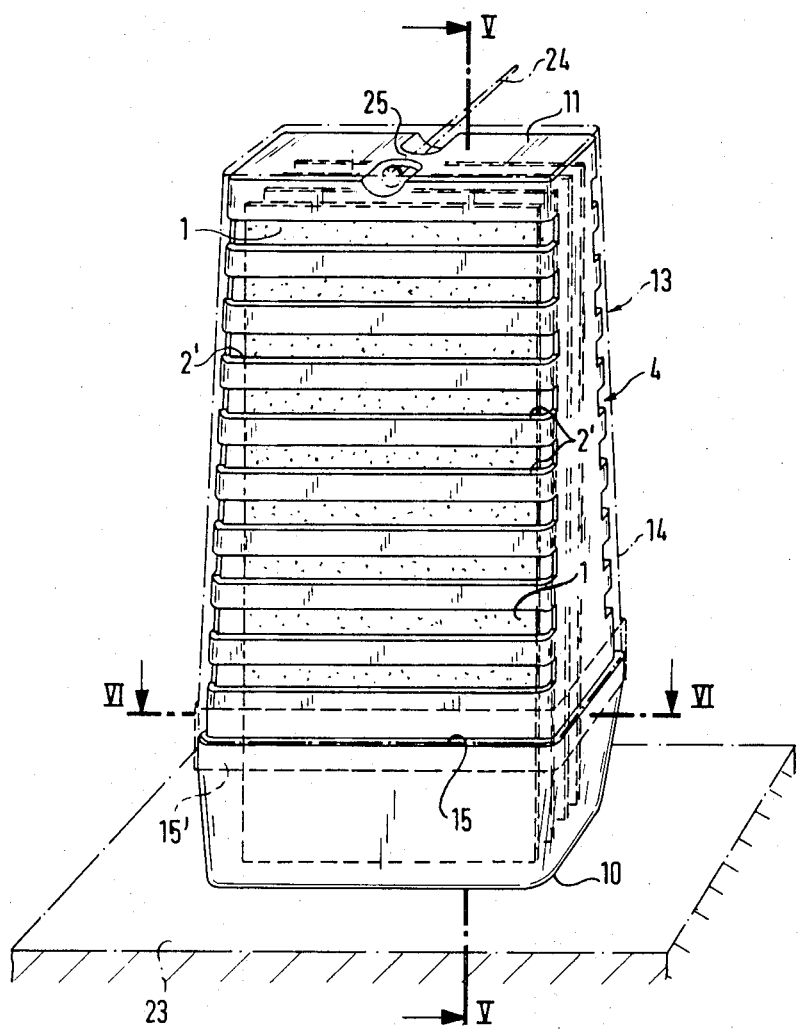
FIG. 4 is a perspective view of another form which the housing can take.
Figure 5:
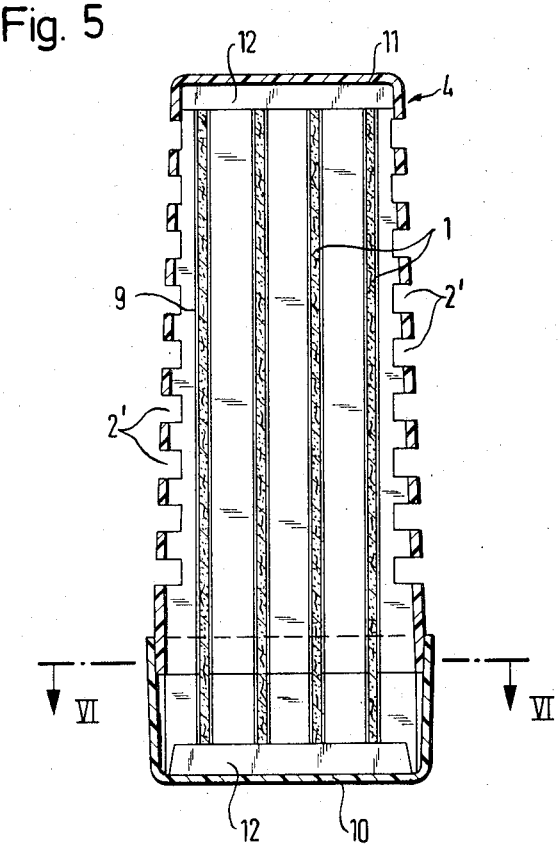
FIG. 5 is a vertical sectional view through the housing of FIG. 4 and is indicated by line V–V on FIG. 4.
Figure 6:
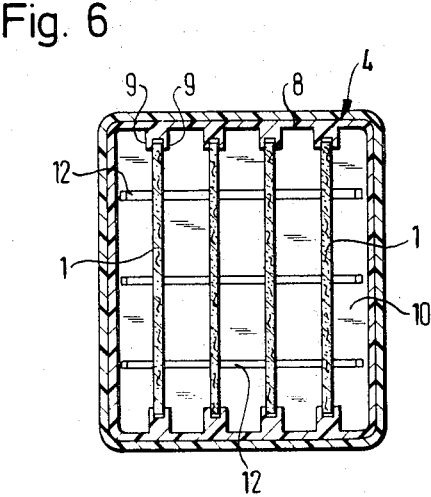
FIG. 6 is a plan section through the housing of FIG. 4 and is indicated by line VI–VI on FIG. 4.

In the modification of FIGS. 4, 5 and 6, the housing 4 is adapted for resting on a surface 23 at the bottom or is adapted for being suspended by a nail or wire 24 engaging a rib 25 on the upper end of the housing.

The housing in FIGS. 4 to 6 has aeration slits 2' in both of the front and back walls, while the narrow sides 8 of the housing are provided with guides or supports 9 for receiving the carrier plates 1. The guides 9 maintain the carrier plates in spaced relation to each other and, also, from the walls of the housing.

Upstanding from the bottom 10 of the housing are ribs or bars 12 extending angularly to the front and back walls of the housing and supporting the carrier plates 1 at the bottom. The top 11 of the housing may, furthermore, have dependent ribs or bars 12 parallel to the corresponding elements upstanding from the bottom 10, whereby the carrier plates are closely confined in the axial direction.

The entire housing at the time of fabrication is enclosed in a protective casing 13 which may be in the form of an air tight flexible plastic hood 14, the lower edge 15 of which may be connected in an air tight manner to the housing 4 by an adhesive strip 15'.

As will be seen in FIG. 5, the housing 4 advantageously comprises a downwardly opening upward portion and an upwardly opening lower portion which telescopically interengage to form a unit.

Figure 7:
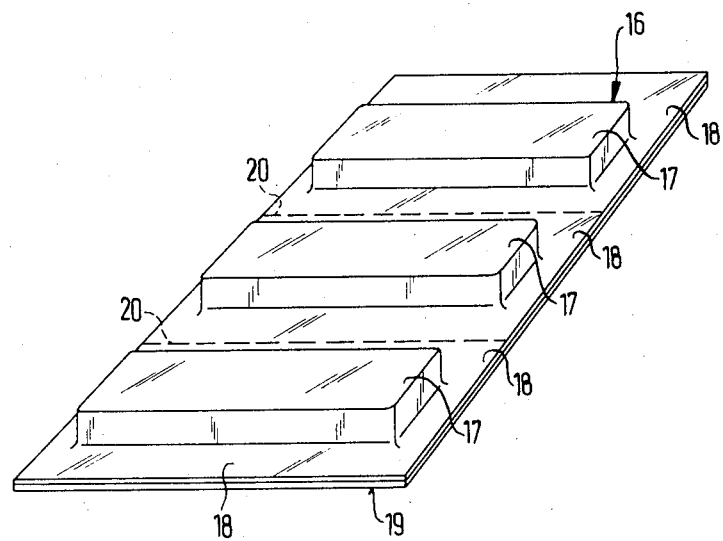
FIG. 7 is a perspective view showing one manner in which carriers adapted to be mounted in the aforementioned housing can be packaged.

FIG. 7 illustrates a package 16 for packaging carrier plates which are used as replacement elements for housings. In FIG. 7, a back panel 19 is provided, cardboard, for example, and thereon is a cover member 18, which may be of transparent plastic material and which has cavities 17 formed therein, as by vacuum molding or the like.

The panel 18 is sealed to panel 19 about the peripheries of the cavities 17 and perforation lines 20 are provided between adjacent ones of the cavities to permit the package to be separated so that the plates can be used one at a time.

The plates according to the present invention prior to impregnation, are advantageously formed of cellulose and asbestos, consisting of about 90 percent cellulose and about 10 percent asbestos. Such a carrier body or plate is porous and is well adapted for becoming impregnated with the material and is not effected thereby. The plates may be about 11.0 cm × 5.5 cm × 0.2 cm in dimension.

Such plates, which form the supporting plates for the material, are immersed in a solution consisting of from about 2 ½ percent up to about 22 ½ percent by weight of evaporation retarder; from about 10 percent up to about 40 percent by weight of active insecticidal agent; from about 0.04 up to about 1 percent by weight of a dye; up to about 10 percent by weight of a solvent for the dye; and up to about 55 percent by weight of a solvent. After impregnation of the plates, the solvent portion of the mixture is evaporated.

The evaporation retarder referred to is thereby dissolved in the active insecticidal agent so that the plate is now impregnated with a true solution, the concentration of which will continuously change due to the evaporation of the insecticidal agent during the active life of the plate. The distribution of the molecules at the exposed surface and inside the body of the plate will, after a certain length of time during which equalization takes place, always be in the same ratio.

As a specific example, a first carrier plate was impregnated with a vaporizable insecticidal agent in the form of a DDVP solution, to which was added 11 percent by weight of a stabilizer calculated on the base of the amount of DDVP present. The carrier plate, weighing about 6 grams, had impregnated therein 2.46 grams of DDVP with added stabilizer.

A second carrier plate of the same weight and size, 2.46 grams of DDVP was supplied and which had been stabilized with 11 percent epichlorohydrin.

The two plates, prepared in the aforesaid manner, were stored in a closed space at 60° C for six days and were thereafter extracted with methylene chloride. The amount of undecomposed DDVP was then determined by gas chromatography. The sample which had been stabilized according to the present invention, namely, the first plate, showed the presence of 2.115 grams residual undecomposed DDVP, whereas the other sample, namely, the second plate stabilized with epichlorohydrin, showed only 1.407 grams of undecomposed DDVP residual.

As to samples disclosing the addition of evaporation retarders, the following example is given.

Two plates of cellulose containing 10 percent asbestos and 11 by 5.5 by 0.2 centimeters in dimensions were impregnated with 10 grams of the following solutions:

Plate A. 4.0 grams DDVP, 6 grams methylene chloride. Plate B. 4 grams DDVP, 2 grams evaporation retarder (polymerization product of propolyene oxide and ethylene oxide), 4 grams methylene chloride.

As due to its high vapor pressure, methylenechloride evaporates very rapidly, plate A retained a residue of 4 grams and plate B retained a residue of 6 grams.

The plates were then introduced into a housing formed of a synthetic polymer, and the evaporation of the DDVP was determined gravimetrically by carefully weighing the housings once a week and noting the difference. The temperature at which the tests were made was about 20 degrees Centigrade.

The test showed the following evaporation rates:

|  | Plate A | Plate B |
| --- | --- | --- |
| 1st week | 0.70 gram | 0.46 gram |
| 2nd week | 0.65 gram | 0.44 gram |
| 3rd week | 0.35 gram | 0.31 gram |
| 4th week | 0.31 gram | 0.30 gram |
| Total | 2.01 grams | 1.51 grams |

From the foregoing, it will readily be observed that the evaporation rate of the DDVP was significantly retarded in respect of Plate B, and that it also occurred much more uniformly than was the case with Plate A.

The utility of the evaporation retarding agent is not restricted to the DDVP used as a specific example as the active insecticidal ingredient, but it may be used with other insecticidal agents which show a high vapor pressure and in respect of which it would be desirable to slow their rate of evaporation. Such other insecticidal agents include B-butoxy-B'-thiocyanodiethyl ether; o, o-dimethyl-S-(1,2-dicarbethoxyethyl) dithiophosphate; o,o-diethyl-0-(2-isopropyl-4-methylpyrimidyl-6) thiophosphate, for example.

What is claimed is:

1. A device for use in insect control comprising:
   a. an insecticidally effective amount of dimethyl dichlorovinyl phosphate,
   b. a porous cellulosic carrier mounted in said device, and
   c. an unmodified epoxy resin stabilizing agent, said resin consisting of the condensation product of Bisphenol A and epichlorohydrin, said carrier being impregnated with said dimethyl dichlorovinyl phosphate and with said epoxy resin.

2. A device according to claim 1 in which said stabilizing amount of said epoxy resin is equal to from about 5 percent up to about 25 percent calculated on the weight of the said dimethyl dichlorovinyl phosphate.

3. A device according to claim 1 in which said carrier comprises a mixture of about 90 percent by weight cellulose and about 10 percent by weight asbestos.

4. A device according to claim 1 in which said carrier is in the form of at least one plate-like member.

5. A device according to claim 1 in which said carrier is in the form of plate means, and wherein said device also comprises a generally cubical housing enclosing said plate means and supporting said plate means in a vertical position and substantially parallel to the front and back walls of said housing, and air access openings formed in at least one of said front and back walls for the movement of air through said housing to convey therefrom vapors of the dimethyl dichlorovinyl phosphate which are given off by said plate means.

6. A device according to claim 5 in which said housing is formed of polyethylene.

7. A device according to claim 5 in which said housing comprises internal ribs engaging said plate means and supporting said plate means in the housing in spaced relation to the walls thereof.

8. A device according to claim 5 in which said plate means comprises a plurality of plates in parallel spaced relation, said housing having guide means therein engaging the edges of said plates, and rib means on the inside of the top and bottom walls of said housing engaging the ends of said plates.

9. A device according to claim 8 in which both of the walls of said housing which are parallel to said plates are provided with air access openings in the form of lateral slits.

10. A device according to claim 8 in which said housing comprises upper and lower parts in telescopic engagement, said slits being formed in said upper part and said lower part being imperforate, said housing comprising a bag-like member of transparent material fitted over said upper part and sealed to said housing near the juncture of said upper and lower parts.

11. A device according to claim 5 which includes a removeable protective cover sealed on the housing and closing at least said air access openings.

12. A device according to claim 1 in which said carrier is in the form of plate means, and wherein said device includes a protective casing for the plate means to seal the plate means from the atmosphere prior to use of the plate means, said casing comprising a back panel and a transparent top panel having cavity means formed therein for receiving said plate means and mounted on said back panel with the cavity means opening toward the back panel, said panels being sealed together about said cavity means.

13. A device according to claim 12 in which said cavity means comprises a plurality of cavities in spaced relation, and perforation line means formed in said panels between said cavities for the separation of said casing along said perforation line means.

14. A device as described in claim 4, wherein each of said plates is impregnated with about 0.4 gram of dimethyl dichlorovinyl phosphate per gram of cellulose.

15. A device as described in claim 14, wherein said epoxy resin is present in said plates in a concentration of about 11 percent calculated on the weight of dimethyl dichlorovinyl phosphate.

* * * * *